Sept. 11, 1951          J. B. SMITH          2,567,243

SLEEVE COUPLING FOR PIPES

Filed Oct. 15, 1949

INVENTOR.
JOSEPH B. SMITH
BY
*Hoodling and Krost*
attys.

Patented Sept. 11, 1951

2,567,243

UNITED STATES PATENT OFFICE 2,567,243

SLEEVE COUPLING FOR PIPES

Joseph B. Smith, Cleveland, Ohio

Application October 15, 1949, Serial No. 121,590

3 Claims. (Cl. 285—196)

The invention relates to pipe couplings and more particularly to pipe couplings for joining pipe-line sections quickly and securely whereby the amount of time that the line is out of service is reduced to a minimum.

An object of the invention is the provision of a pipe coupling having an endless packing member compressed sidewise for squeezing same against a pipe inserted in the coupling, taken in combination with radially extending threadable clamping elements for engaging the pipe to resist longitudinal movement of the pipe from the coupling.

Another object of the invention is the provision of a coupling which may be readily connected to a pipe-line section by hand tools to restore service quickly and which may be subsequently welded to the pipe while in service for making a permanent connection.

Another object of the invention is the provision of a coupling having radially extending threadable openings with threadable clamping elements recessibly disposed therein for engaging the pipe, and with said holes being plug welded to permanently seal said holes.

Another object of the invention is the provision of a coupling having longitudinally extending fingers integrally connected to the ends thereof and surrounding the pipe to facilitate the welding of the coupling to the pipe.

Another object of the invention is the provision of a coupling having a stepped shoulder at the ends thereof and surrounding the pipe to facilitate the welding of the coupling to the pipe.

Another object of the invention is the provision of a coupling having annularly spaced openings extending longitudinally inwardly from the ends thereof to assist in cold relieving of welding stresses.

Other objects and a fuller understanding of the invention may be had by referring to the following description and claims, taken in conjunction with the accompanying drawings, in which:

Figures 5, 6:
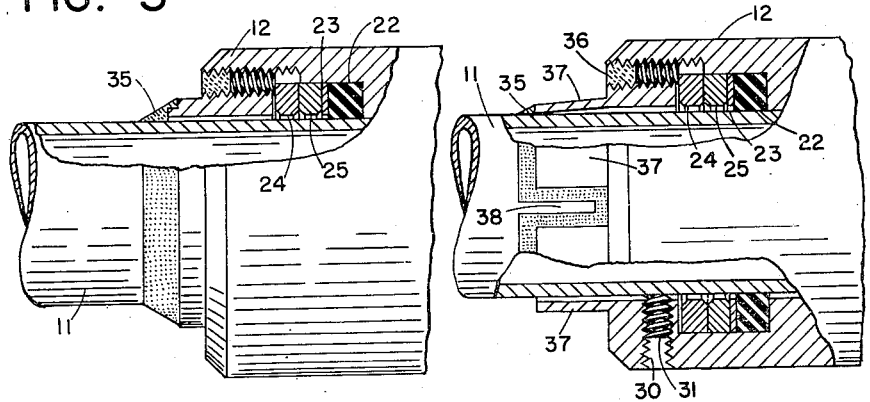

Figure 5 is a fragmentary view of a modified end of the coupling and shows principally a stepped shoulder to facilitate the welding of the coupling to the pipe; and Figure 6 is a fragmentary view of a further modified end of the coupling and shows principally longitudinally extending fingers integrally connected to the coupling and surrounding the pipe to facilitate the welding of the coupling to the pipe.

Figures 1, 2:
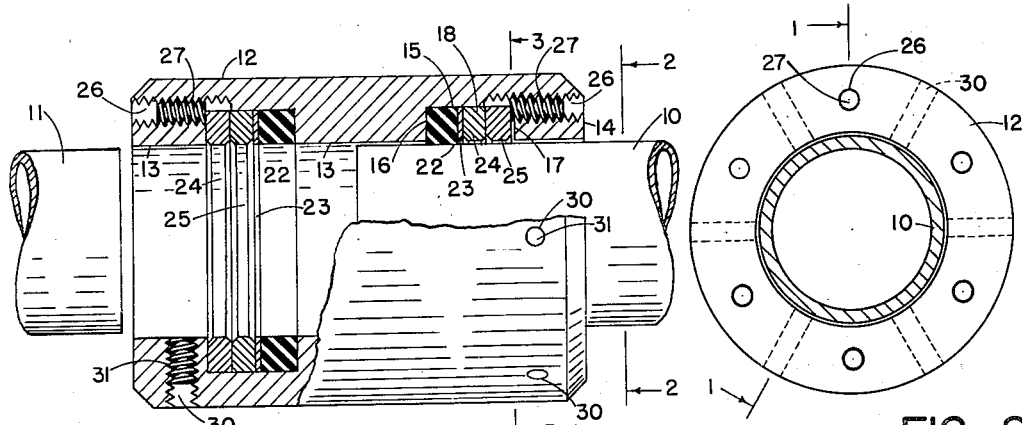
Figure 1 is a longitudinal cross-sectional view of a coupling embodying the invention, taken along the line 1—1 of Figures 2 and 3, the lower right-hand portion of the coupling being shown in side elevation to illustrate the external disposition of the engaging set screws.
Figure 2 is a cross-sectional view taken along the line 2—2 of Figure 1 and shows principally the end view of the coupling.
Figures 3, 4:
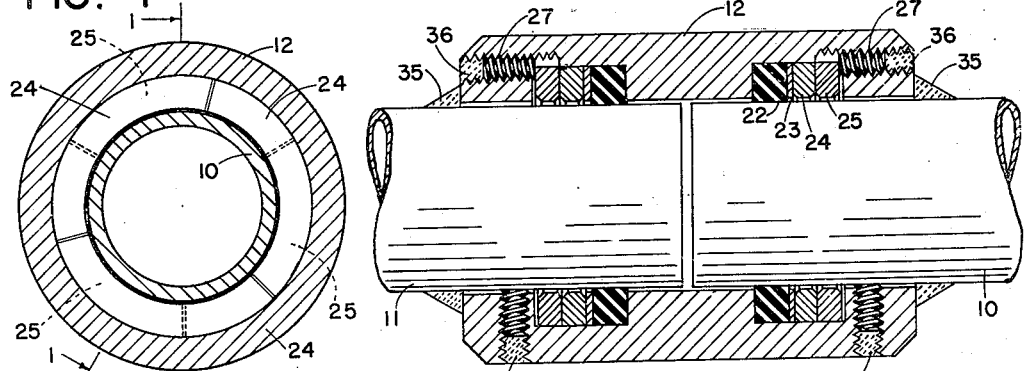
Figure 3 is a cross-sectional view taken along the line 3—3 of Figure 1 and shows principally the end view of the segmental arcuate thrust members.
Figure 4 is a longitudinal cross-sectional view of the coupling completely assembled on the pipes.

The coupling comprises principally a sleeve 12 having a bore 13 adapted to receive pipes 10 and 11, respectively. The two end portions of the pipes 10 and 11 extend into the sleeve 12 and substantially meet intermediate the ends of the sleeve. Inasmuch as the construction of the sleeve at each end is identical, the description will be devoted principally to the right-hand end thereof with regards to the arrangement of the internal parts for making the seal between the sleeve and the pipe which is inserted therein. Extending radially outwardly from the bore 13 of the sleeve 12 and disposed longitudinally inwardly from the external end surface 14, is an internal groove 15 having opposite end walls 16 and 17 interconnected by an annular internal wall 18. Within the internal groove 15 is an endless packing member 22 which may be constructed of any suitable deformable material of a rubber-like nature. The left-hand side of the packing member 22 faces the end wall 16 of the groove. Mounted next adjacent to the right-hand side of the packing member 22 is a bendable washer 23 which is of a continuous annular construction and of relatively thin cross section. Disposed between the right-hand side of the bendable washer 23 and the end wall 17 of the groove are two sets of split rings 24 and 25, with each set comprising segmental arcuate members. As shown in Figure 3, each set preferably comprises three arcuate segments with their abutting ends for the two sets staggered with respect to each other. As shown in Figure 1, the segmental arcuate members are adapted to be pressed sidewise to the left, forcing the continuous washer 23 against the packing member 22 by means of longitudinally extending threadable thrust members or set screws 27 which are threadably engaged within longitudinally extendable threadable opening 26 which extend from the annular end surface 14 of the sleeve to the end wall 17 of the internal groove. As shown in Figure 2, the set screws 27 are spaced annularly about the end of the sleeve, being six in number shown in Figure 2, but it is to be understood that any other number may be employed for this purpose.

In assembling the parts within the internal groove, the bendable washer 23 is first inserted. This is done by bending the washer substantially diametrically thereacross until it will slide within the bore 13 of the sleeve. After the washer 23 has been inserted within the groove 15, it is then bent back substantially straight again, whereby its outer peripheral surface fits within the annular internal wall 18 of the groove. After the washer is bent back substantially straight, its left-hand side is then pushed against the end wall 16 of the groove. The next step in assembly of the parts is to insert the first set of segmental members 24. In mounting the three segmental members of the first set, the procedure is to mount two of the segmental members and then the third member is slid in sidewise completing the split ring. The second set of segmental members 25 is mounted in the same fashion. This is made possible since the packing member 22 has not as yet been mounted, and sufficient end play is provided to insert the last of the segmental arcuate members in sidewise to make the complete split ring. When once the segmental members are mounted, they will remain in place since they cannot fall out because the abutting ends of the split rings support the rings within the internal groove. After the two sets of segmental rings are mounted, the washer is then moved to the right until the right-hand side thereof abuts against the left-hand side of the split ring 24 after which the packing member 22 is then mounted between the washer 23 and the end wall 16. The packing may be of any suitable rubber-like material, and thus it can be inserted within its annular internal groove by deforming same while positioning it in place. The inner edges of the segmental rings are preferably bevelled so that the pipe may be inserted therein without striking the corners of the segmental rings. Placed annularly about the outside of the sleeve are a plurality of threaded holes 30 to receive threadable clamping elements or set screws 31 for radially clamping the pipe to prevent longitudinal movement of the pipe from the sleeve. Six set screws 31 are preferably employed but any number may be employed to resist longitudinal movement of the pipe from the coupling. The set screws 27 and 31 are preferably of the hollow-head type adapted to be engaged by a suitable interfitting tool.

In assembly, when the parts are mounted as shown in Figure 1, the thrust set screws 27 are screwed in by any suitable tool until the endless packing 22 is pressed sidewise and squeezed tightly against the outer surface of the pipe. The clamping set screws 31 are turned inwardly until they firmly engage the outside surface of the pipe so that they will resist longitudinal pull of the pipe from the sleeve.

One particular use for this coupling is for joining pipe-line sections quickly and securely whereby the amount of time that the line is out of service is reduced to a minimum. The pipe line may be restored to service just as soon as the sleeve is mounted around the pipe sections and the set screws tightened down. Thus, the coupling may be readily connected to a pipe-line section by hand tools to restore service quickly and safely.

The final seal of the sleeve to the pipe is effected by welding as shown in Figure 4, and this may be done at any time after the seal is effected by tightening the set screws, as shown in Figure 1, which condition may continue for several days or even months before the welding operator reaches the job to make the permanent welded connection. In this way it is not necessary for the welder to go immediately to the job and weld the sleeve to the pipes but may schedule his welding operations in a safe and efficient manner to produce the largest amount of effective work over a given length of time. In welding the sleeve to the pipes, the first operation is to string or deposit a fillet weld 35 around the ends of the couplings and secure same to the pipe. This effects a definite seal between the bore 13 of the sleeve and the pipe. As illustrated in Figure 4, the set screws 27 are far enough back in their openings 26 so that the weld from the fillet does not reach the set screws, and thus, this weld does not interfere with a tool engaging the thrust set screws 27 whereby they may be still tightened even though the sleeve is welded to the pipes. The distance from the end 14 of the coupling back to the thrust split ring 25 is ample so that the effective length of threaded openings 26 eliminates any danger of the set screw threads being stripped. Also, after the coupling is installed and the thrust set screws 27 have been tightened and pressure is turned into the pipe line, thereby placing an additional load on the thrust set screws, the extra length of the threads in the openings 26 over and above the length of the recessed set screws 27 provides an added safety factor.

It is to be observed that the clamping set screws 31, when fully turned in against the pipe, are recessed within the threadable holes 30 and the welder plug welds these holes at 34 as illustrated in Figure 4 so that a perfect seal is provided from the escape of fluid through the threaded openings. In practice, the clamping set screws 31 are preferably hardened, high tensile strength steel for making a firm bite into the pipe to prevent longitudinal movement of the pipe from the bore of the sleeve and by providing a recessed space on top of the set screws 31, a sufficient amount of welded material may be disposed to make a good seal. When weld metal is deposited over the top of the set screws 31 in order to effect a good leak-proof sealing weld, sufficient welding rod may be deposited to dilute the high tensile strength steel of the set screws, so that the resulting weld will be soft enough to cold stress relieve itself. If the top of the set screws 31 were flush with the outside of the sleeve, the sealing weld would be apt to contain so much of the high tensile strength steel that it would be brittle and have pin holes, resulting in breaks or leaks. The set screws 27 are likewise recessed in their respective openings 26 and may be plug welded at 36 the same as that described for the set screws 31. It should also be noted that the thrust set screw openings 26 provide a certain amount of additional flexibility to the coupling end so that when the fillet weld is made at the end, the coupling can more readily expand and yield as the weld metal cools and sets up stresses. The thrust set screw opening in the ends of the coupling assist in cold relieving of field weld stresses. This stress relieving is of utmost importance.

In the manufacture of sleeves for large-size pipes, a stepped shoulder is provided on the ends of the sleeves, such as shown in Figure 5. In this manner the amount of welding material to be used to make a good weld is materially reduced since the stepped shoulder occupies space which would normally be occupied by welding material. The stepped end assists the welder to complete a large rugged looking fillet weld in a much shorter time. Without the step the fillet weld would be all deposited metal. It is apparent that the stepped construction will permit a more rapid completion of the welded job with equivalent strength so far as area of contact with the end of the coupling is concerned.

In the making of large-size pipe there is a considerable amount of manufacturing tolerances in the external diameter of the pipe. Accordingly the bore in the sleeve must be sufficiently large to take a tubing having the largest tolerance. Thus, on the larger sizes of couplings, the bore of the coupling has to be sized much larger than the external diameter of the pipe in order to insure that any coupling will fit any pipe. The tolerance may be in the order of ⅛ to ¼ inch for large-size pipe, and in order to facilitate the welding of a sleeve which may have an annular gap as much as ¼ inch between the bore of the sleeve and the pipe, the ends of the sleeve are provided with segmental arcuate extending fingers 37 integrally connected to the sleeves. These fingers 37 are made by providing annularly spaced slots 38 around the extended end portion of the sleeves. Prior to welding these extended fingers 37 to the pipes, the operator hammers or bends the ends of the fingers against the pipe, reducing the annular clearance space as shown in the upper cut away section of Figure 6 after which he fillets welds around the ends of the extended fingers as well as along the sides of the slots. The bottom cut away section of Figure 6 shows the clearance between pipe and the fingers before they are bent down for welding. The longitudinal set screw openings 26 in the end of the sleeve provide a greater amount of area in contact with air and thereby provide more rapid dissipation of heat from welding operation so that the packing rings will not become overheated and tend to soften or weaken in shearing strength.

With the coupling described herein the rejoining of the pipeline can be performed in a manner calculated to reduce fire and explosion hazards to a minimum where pipe lines used for conducting inflammable fluids are involved. The clamping set screws 31 permit adjustment of the annular space between the inner bore of the coupling and the outer pipe wall. For example, if the bottom of the pipe is badly pitted and the sides and top are not so badly pitted as is frequently the case, the set screws 31 are used to draw the coupling closer to the pipe where the pits are deepest, thus providing for a more effective disposition of the packing ring when pressure is applied to it by the thrust rings. The deeply pitted wall being closer, the packing ring can more effectively be forced to flow down into the bottom of the pits. Also where the pipe exterior is fairly uniform the annular space may be equalized for more uniform welding. The clamping set screws 31 likewise maintain the adjustment of said annular space while the thrust set screws 27 are tightened and packing rings are being compressed.

Moreover, the clamping set screws 31 maintain the adjustment of said annular space while ends of couplings are being hammered down closer to the pipe wall, as shown in Figure 6.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A pipe coupling comprising a one-piece annular sleeve having a longitudinal bore to receive the end portion of a pipe, said sleeve having an external annular end surface and an internal groove extending radially outwardly from the bore and located at a spaced distance from the said external end surface, said groove having first and second opposing end walls and an annular internal wall extending therebetween, said first end wall of the groove being spaced at a greater distance from said external end surface than said second end wall, an endless packing member having first and second sides disposed in said groove with said first side of the packing member facing the first end wall of the groove, thrust ring means insertable through said bore of the sleeve and having first and second sides disposed in said groove with the first side of the ring means facing the second side of the packing member and with the second side of the ring means facing the second side of the groove, said packing member and said ring means having external surfaces fitting within the annular internal wall of the groove and having internal surfaces defining an annular opening to receive the end portion of a pipe inserted in the coupling, said sleeve having threaded openings extending longitudinally from said external end surface and to the second side of the groove, threaded thrust members in said threaded opening and having end portions adapted to engage the second side of the ring means and press the first side of the ring means toward the packing member for squeezing same radially inwardly against the end portion of a pipe inserted therein, said sleeve having radially extending threaded holes longitudinally disposed between the said external end surface and the second side of the groove, and threaded clamping elements in said threaded holes having end portions adapted to engage the end portion of a pipe inserted therein for resisting longitudinal movement of said pipe from said sleeve and for adjusting annular space between pipe and coupling.

2. A pipe coupling comprising a one-piece annular sleeve having a longitudinal bore to receive the end portion of a pipe, said sleeve having an external annular end surface and an internal groove extending radially outwardly from the bore and located at a spaced distance from the said external end surface, said groove having first and second opposing end walls and an annular internal wall extending therebetween, said first end wall of the groove being spaced at a greater distance from said external end surface than said second end wall, an endless packing member having first and second sides disposed in said groove with said first side of the packing member facing the first end wall of the groove, thrust ring means insertable through said bore of the sleeve and having first and second sides disposed in said groove with the first side of the ring means facing the second side of the packing member and with the second side of the ring means facing the second side of the groove, said packing member and said ring means having external surfaces fitting within the annular internal wall of the groove and having internal surfaces defining an annular opening to receive the end portion of a pipe inserted in the coupling, said sleeve having threaded openings extending longitudinally from said external end surface and to the second side of the groove, threaded thrust members in said threaded opening and having end portions adapted to engage the second side of the ring means and press the first side of the ring means toward the packing member for squeezing same radially inwardly against the end portion of a pipe inserted therein said sleeve having radially extending threaded holes longitudinally disposed between the said external end surface and the second side of the groove, and threaded clamping elements in said threaded holes having end portions adapted to engage the end portion of a pipe inserted therein for resisting longitudinal movement of said pipe from said sleeve, said sleeve having said external end surface welded to said pipe, said threaded elements being recessibly disposed in said threaded holes and being plug welded to seal said holes.

3. A pipe coupling comprising a one-piece annular sleeve having a longitudinal bore to receive the end portion of a pipe, said sleeve having an external annular end surface and an internal groove extending radially outwardly from the bore and located at a spaced distance from the said external end surface, said groove having an end wall constituting an abuttable shoulder, an annular packing member having first and second sides disposed in said groove, said first side engaging said abuttable shoulder and said second side constituting a mechanical pressure contact side, thrust ring means insertable through said bore of the sleeve and disposed in said groove, said thrust ring means having a mechanical pressure face for pressing the mechanical pressure contact side of the annular packing member, said packing member and said thrust ring means fitting within the groove and having internal surfaces defining an annular opening to receive the end portion of a pipe inserted in the sleeve, said sleeve having openings extending longitudinally from said external end surface of the sleeve to said groove, mechanical elements in said longitudinal extending openings and having an inner end terminating in said groove and having an outer end accessible externally of the sleeve, said inner end portion of the mechanical elements engaging the thrust ring means to press the mechanical pressure face thereof against the mechanical pressure contact side of the annular packing member for squeezing said annular packing member radially inwardly against the end portion of a pipe inserted therein.

JOSEPH B. SMITH.

REFERENCES CITED

The following references are of record in the file of this patent:

UNITED STATES PATENTS

| Number | Name | Date |
| --- | --- | --- |
| 755,442 | Brickell | Mar. 22, 1904 |
| 1,146,670 | Tippett | July 13, 1915 |
| 1,242,380 | Skinney | Oct. 9, 1917 |
| 2,172,141 | King | Sept. 5, 1939 |
| 2,289,271 | Kane | July 7, 1942 |